(12) United States Patent
Heino

(10) Patent No.: US 6,797,741 B1
(45) Date of Patent: Sep. 28, 2004

(54) METHOD IN CONNECTION WITH PROCESSING POLYMER OR ELASTOMER MATERIAL

(75) Inventor: Aarne Heino, Turenki (FI)

(73) Assignee: Maillefer S.A., Ecublens (CH)

( * ) Notice: Subject to any disclaimer, the term of this patent is extended or adjusted under 35 U.S.C. 154(b) by 0 days.

(21) Appl. No.: 09/980,710

(22) PCT Filed: Jun. 28, 1999

(86) PCT No.: PCT/FI99/00570

§ 371 (c)(1),
(2), (4) Date: Dec. 13, 2001

(87) PCT Pub. No.: WO01/00381

PCT Pub. Date: Jan. 4, 2001

(51) Int. Cl.⁷ .................................................. C08F 2/46
(52) U.S. Cl. .......................... 522/157; 522/60; 522/24; 522/28; 522/62; 522/150; 522/113; 522/130; 264/493; 264/496; 264/492; 264/481; 264/476; 250/492.1; 250/493.1
(58) Field of Search .............................. 522/60, 24, 28, 522/62, 157, 113, 130, 129, 126; 264/493, 496, 492, 481, 476; 250/492.1, 493.1, 493

(56) References Cited

U.S. PATENT DOCUMENTS

| 4,144,111 A | * | 3/1979 | Schaerer ..................... 156/187 |
| 4,738,868 A | | 4/1988 | Fischer et al. |
| 4,894,284 A | | 1/1990 | Yamanouchi et al. |
| 6,106,761 A | * | 8/2000 | Sjoberg et al. ............. 264/492 |

FOREIGN PATENT DOCUMENTS

| GB | 1562814 | * | 3/1980 |
| GB | 2 283 489 A | | 5/1995 |
| JP | 59-099611 A2 | | 11/1982 |
| JP | 61-92459 | | 7/1994 |
| WO | WO 97/10936 A2 | | 3/1997 |

* cited by examiner

Primary Examiner—Sam A. Acquah
Assistant Examiner—Sanza L. McClendon
(74) Attorney, Agent, or Firm—Oliff & Berridge, PLC

(57) ABSTRACT

The invention relates to a method in connection with processing polymer or elastomer material, wherein additive is added to the polymer or elastomer material, and the additive is subjected to the desired chemical reaction. To minimize energy consumption, infrared radiation is led to the polymer or elastomer material, the wavelength of the radiation being so chosen that the radiation penetrates optimally the polymer or elastomer material, but absorbs in the additive, producing the desired reaction in the additive.

13 Claims, No Drawings

METHOD IN CONNECTION WITH PROCESSING POLYMER OR ELASTOMER MATERIAL

The invention relates to a method in connection with processing polymer or elastomer material, wherein additive is added to the polymer or elastomer material, and the additive is subjected to the desired chemical reaction.

It has been generally known to modify the properties of a material by means of various additives in different technical fields which use polymer and elastomer materials. Often such an additive alone may provide the desired improved properties, when well mixed with the material, which is true of dyes, antistatic agents, reinforcers and filling agents, for example.

In some cases, the desired change in the properties of a plastic material is subject to achieving a chemical reaction in the additive, for example chemical decomposition of the additive by means of heat. A typical example of such an additive is a chemical crosslinking agent, such as organic peroxide. In this case, the crosslinking agent is added to the plastic either in a separate process (compounding) or during manufacture of the plastic product, or it is decomposed by means of heat immediately after a machining process, such as extrusion.

Another example of an additive which has to be chemically decomposed before the effect is achieved, is a chemical foaming agent, such as azo dicarbonamide, which under the influence of decomposition frees nitrogen gas by means of which a foamed structure is obtained for the plastic material.

The chemical reaction of the above additives, i.e. chemical decomposition position in the above cases, is conventionally implemented by heating the entire plastic material to a temperature causing sufficient decomposition of the additive. In practice, heating may take place immediately after the manufacture of the plastic product on the line or as a separate process.

An example of a practical process in which the above measures are taken, is the crosslinking process taking place in the manufacture of cables. In a conventional manufacturing method, the entire insulated or coated conductor and its insulants are heated to a sufficiently high temperature so as to cause the peroxide to decompose. Much energy is required for a sufficiently high temperature to heat the entire polymer material, and, furthermore, because the heat conductivity of polymer is weak, the process is time-consuming. It should be noted here that the proportion of additives is only about 2% of the quantity of the polymer material.

At high temperatures, peroxide disintegration products, of which a significant part is water, are gaseous, and as the temperature of the polymer is also high, they easily cause bubbles to form in the coating layer. Because of the above reasons, in conventional crosslinking, the product to be crosslinked often has to be placed in a pressurized space in order to make peroxide disintegration products dissolve in the polymer without producing bubbles. In addition, the product has to be cooled in a pressurized space in order to prevent bubbling.

Another example of typical decomposition of additives on the line is to manufacture a crosslinked plastic tube by a chemical method. In this case, the peroxide-containing raw material is extruded into a tube at a temperature substantially not causing the peroxide to decompose. Immediately after the end of the extruder, the tube is heated to a temperature at which sufficient peroxide decomposition takes place and the plastic is crosslinked.

In practice, the above heating can be carried out in a plurality of ways, but they are all characterized in that the entire wall of the plastic tube is heated to a temperature causing a sufficient part of the peroxide to decompose. The problem here is the poor heat conductivity of the plastic material. The heating distance has to be long in order for the heat to have time to pass via the outer surface of the tube to the entire width of the wall. Let it be mentioned by way of example, that when an HD polyethene tube is crosslinked by means of di-tertiary butyl peroxide, the temperature after the extruder has to be raised by nearly 100 degrees Celsius in order to obtain a sufficient crosslinking level. At a typical line rate of 10 m/min, this indicates a heating length of about 10 meters. This calls for special arrangements in order for the tube to retain its shape during heating.

To eliminate the above problem, Finnish published specification 94106, for example, discloses a heating method wherein a tube is supported by two grooved pulleys during heating. During heating, the tube is conveyed in the grooves of the pulleys, the shape of the groove preventing the tube from deformation.

The fact that a long-term high temperature causes ageing in the molecular structure of plastic thus weakening the long-term properties of the final product, poses a second problem in the above methods involving strong heating of a plastic material. This drawback can be alleviated by providing an inert gas phase around the tube for the duration of the heating, as has been done in the method of the above Finnish published specification; but in any case a plastic structure always contains some free oxygen which, together with heat, causes ageing.

A third example of additive decomposition on the line is simultaneous manufacture of foamed and crosslinked polymeric products. This involves extrusion of a product, e.g. a plate or tube, containing organic peroxide and a chemical foaming agent. Immediately after the extruder, the product is subjected to heating, whereby both the peroxide and the foaming agent start to decompose, producing a foamed and crosslinked structure. Both additives have to decompose exactly in a given proportion to each other in order for a sufficiently high foaming degree to be reached, because a non-crosslinked structure does not tolerate abundant foaming and, because, on the other hand, an overly crosslinked structure is not capable of foaming, the crosslinking increasing the strength of the structure over the gas pressure released from the foaming agent.

Another problem in the above case is posed by the fact that as the structure gets foamed, its heat conductivity weakens, thereby further impairing the supply of additional heat to the inside of the structure.

In all the above exemplary cases, an additional problem rises because the product has to be cooled after the heating step, and, because the decomposition of the additive requires a high rise in temperature, the need for cooling is also significant, rendering the cooling distance long. As regards a foamed structure, the cooling distance is further increased by the fact that the foaming has further weakened the heat conductivity.

It is an object of the invention to provide a method for eliminating prior art problems. This is achieved by the method of the invention, which is characterized in that infrared radiation is introduced into the polymer or elastomer material, the wavelength of the radiation being so chosen that the radiation optimally penetrates the polymer or elastomer material, but absorbs in the additive producing the desired chemical reaction therein.

Thus the starting point of the invention is what is known as 'selectively induced chemical reaction in additive', for example 'selective heating'. When viewing the above examples, one may state that in all cases the heating of the polymer or elastomer material is a secondary process, which only causes the additive in the polymer or elastomer material to be heated, for example, and thereby to decompose. Heating the polymer or elastomer material is above all an impediment requiring complicated arrangements and consuming extra energy in both the heating and cooling steps. The advantage provided by the invention as compared with prior solutions is based on the above points, since in the invention, only the additive, e.g. peroxide, is heated, the portion of which is about 2% of the quantity of the polymer material. Hence much heating energy is saved as compared with a conventional crosslinking method wherein the entire polymer material is heated, even above the decomposition temperature of peroxide, in order to control the disadvantages of the slowness of the process, caused by weak heat conductivity of the polymer material. Once the peroxide is made decompose, and the temperature of the surrounding polymer is significantly lower, the process may also be carried out at a lower pressure without fear of bubbles produced by decomposition products. Consequently, the above structures relating to a pressurized space can be simplified, since the polymer material is more rigid at a lower than at a higher temperature. At best, they may be altogether abandoned, resulting in significant savings. The invention also provides notable advantages in that the polymer or elastomer material does not have to be subjected to high temperatures during such a long time as in prior art, whereby the material does not suffer from high temperatures. In connection with the invention, an example may be mentioned involving as much as 50 degrees lower temperatures of polymer material than in prior art in the manufacture of cables, for example.

In the method of the invention, the heat required to decompose the additive is supplied to the polymer or elastomer material in the form of infrared radiation in such a way that the wavelength of the radiation used is so chosen that it penetrates well the polymer or elastomer material, but absorbs in the additive producing therein the desired chemical reaction, for example heating and decomposition.

As is well known in the art, each molecular structure possesses different characteristic oscillating frequencies. Such oscillations include oscillation of the entire molecule, oscillations between molecular parts and oscillations of the bonds in the molecule. When infrared radiation is introduced into such a structure, it turns into heat when the radiation, encounters oscillation having the same wavelength as the radiation itself. In this case the radiation is absorbed in the object and consequently converted into heat.

The conversion of infrared radiation into heat is, however, not the only feasible process, but infrared radiation, when being absorbed in the additive, may naturally also be bonded directly to the desired chemical reaction without substantially heating the additive or parts thereof.

Once the characteristic oscillation frequencies of the polymer or elastomer material and the desired additive are known, the infrared radiation wavelength range can be so chosen that it optimally corresponds to the characteristic oscillation frequencies of the additive,, whereby the desired chemical reaction, for example heating, can be mainly directed to the additive. However, in this case it should be noted that a completely selectively directed chemical reaction, such as the above-mentioned heating, is not possible, because some infrared radiation also absorbs in the polymer or elastomer material. This is because, when referring to the wavelength of radiation, the issue is always about a given wavelength distribution comprising different quantities of radiation of different lengths and it is extremely likely that some wavelengths also match the characteristic oscillations of the polymer or elastomer material. However, this property can be reduced by eliminating wavelengths detrimental to the process from the infrared radiation. Elimination of detrimental wavelengths can be carried out for example by a suitable filter.

As an example of the implementation of the method of the invention can be mentioned a test in which a plastic tube was extruded from high-molecular weight HD polyethene having a density of 952 kg/m$^3$ and a melt index of about 6, measured on a weight of 21 kg. Before extrusion, 0.7% of 2,5-dimethyl-2,5-(tertbutylperoxide)-hexyne-3-peroxide and a total of 0.5% of different antioxidants were mixed with the polyethene.

Immediately after the extruder there was arranged an infrared heater unit composed of four 500-mm heaters, each having a power of 3 kW, at intervals of 90 degrees so that a quadratic space for the tube formed therebetween. Three such aggregates of four heaters were arranged in succession, the total length being 1,500 mm and the total power 36 kW. A quartz tube was installed inside the heater unit to protect the plastic tube.

A tube having an outer diameter of 20 mm and a wall thickness of 2 mm was driven from the extruder at a rate of 8 m/min through said infrared heater unit, whereupon the product was cooled in a water basin installed on the same line. The power of the infrared resistors in the heater unit was adjusted within the range 60 to 100%, whereby the mean wavelength of the radiation varied within the range 5.0 to 1.2 micrometers. The adjustment may be implemented by means of the temperature of the infrared source, for example.

Samples were taken from the test run at different wavelengths, and crosslinking degrees were measured from the samples, whereby it was noted that the best crosslinking degree (78%) was achieved at the lowest wavelength, 1.2 micrometers.

The second test was a static additional test in which a temperature sensor was arranged inside the wall of a similar plastic tube, infrared radiation was led to the surface of the tube at the same wavelengths as above, and the rise in temperature was measured in the middle point of the wall as a function of time. The result shows that the highest rise in temperature was achieved at wavelengths of 3.3 to 3.6 and 6.7 to 6.9 micrometers.

To summarize the above two tests, it can be concluded that the wavelength used in the first test well penetrated polyethene plastic, the rise in temperature being relatively low, but absorbed well in the peroxide, since the crosslinking degree was excellent. On the other hand, in the first test, at the wavelength 3.5 micrometers, the crosslinking degree remained at the level 45%, indicating that the temperature rise in the polyethene was not sufficient for peroxide decomposition, although according to the second test the highest temperature rise in the plastic was obtained at this very wavelength.

On the basis of the above facts it was stated that peroxide decomposition at the wavelength 1.2 micrometers took place expressly because infrared radiation absorbed in the peroxide and barely at all via heating of the plastic material.

The above applications are in no way intended to restrict the invention, which may be modified freely within the scope of the claims. The invention may be applied to extremely different processes requiring the desired chemical reaction in the additive, but not in the polymer or elastomer material. An example is to heat the additive so as to minimize heating of the polymer or elastomer material. One application of the invention is to direct the chemical reaction only to some additive and not to all the additives in the polymer or elastomer material. As examples of processes in which the invention can be used have previously been mentioned a crosslinking process using peroxide in manufacture of cables, etc. As other feasible processes, reference is made to processes used in sulphuric vulcanisation of rubber. However, in all processes it should be noted that an optimal infrared radiation wavelength range has to be found for each polymer or elastomer material/additive combination.

What is claimed is:

1. A method for processing polymer or elastomer material, comprising:

adding additive to the polymer or elastomer material; and subjecting the additive to a desired chemical reaction;

wherein:

infrared radiation is introduced into the polymer or elastomer material, the radiation having a wavelength that optimally penetrates the polymer or elastomer material, but absorbs in the additive to produce the desired chemical reaction therein; and the wavelength of the infrared radiation is chosen on the basis of the characteristic oscillation frequencies of the polymer or elastomer material and the additive, so that the wavelength corresponds optimally to the characteristic oscillation frequencies of the additive and as poorly as possible to the characteristic oscillation frequencies of the polymer or elastomer material.

2. The method of claim 1, wherein the additive is an organic peroxide.

3. The method of claim 1, wherein the additive is a chemical foaming agent.

4. The method of claim 1, wherein the wavelength of the infrared radiation is produced by means of the temperature of the infrared source.

5. The method of claim 1, wherein the infrared radiation is chosen by removing wavelengths which absorb in the polymer or elastomer material.

6. The method of claim 5, wherein wavelengths which absorb in the polymer or elastomer material are removed from the infrared radiation by means of a filter.

7. The method of claim 1, wherein infrared radiation is led to the polymer material in connection with a crosslinking process for an insulating or coating layer carried out in the manufacture of cables.

8. The method of claim 4, wherein the infrared radiation is chosen by removing wavelengths which absorb in the polymer or elastomer material.

9. The method of claim 2, wherein infrared radiation is led to the polymer material in connection with a crosslinking process for an insulating or coating layer carried out in the manufacture of cables.

10. The method of claim 3, wherein infrared radiation is led to the polymer material in connection with a crosslinking process for an insulating or coating layer carried out in the manufacture of cables.

11. The method of claim 4, wherein infrared radiation is led to the polymer material in connection with a crosslinking process for an insulating or coating layer carried out in the manufacture of cables.

12. The method of claim 5, wherein infrared radiation is led to the polymer material in connection with a crosslinking process for an insulating or coating layer carried out in the manufacture of cables.

13. The method of claim 6, wherein infrared radiation is led to the polymer material in connection with a crosslinking process for an insulating or coating layer carried out in the manufacture of cables.

* * * * *